US012637157B2

(12) United States Patent
Thorén et al.

(10) Patent No.: US 12,637,157 B2
(45) Date of Patent: May 26, 2026

(54) TRACK ASSEMBLY FOR A TRACKED VEHICLE

(71) Applicant: BAE Systems Hägglunds Aktiebolag, Örnsköldsvik (SE)

(72) Inventors: Max Thorén, Örnsköldsvik (SE); Björn Hellholm, Arnäsvall (SE); Viktor Risberg, Lycksele (SE); Alex Oddsgård, Luleå (SE); Axel Magnusson, Luleå (SE); Mattias Karlsson, Boden (SE)

(73) Assignee: BAE Systems Hägglunds Aktiebolag, Örnsköldsvik (SE)

( * ) Notice: Subject to any disclaimer, the term of this patent is extended or adjusted under 35 U.S.C. 154(b) by 335 days.

(21) Appl. No.: 18/551,366

(22) PCT Filed: Mar. 24, 2022

(86) PCT No.: PCT/SE2022/050287
§ 371 (c)(1),
(2) Date: Sep. 19, 2023

(87) PCT Pub. No.: WO2022/203587
PCT Pub. Date: Sep. 29, 2022

(65) Prior Publication Data
US 2024/0166277 A1     May 23, 2024

(30) Foreign Application Priority Data
Mar. 25, 2021     (SE) ................................... 2150359-4

(51) Int. Cl.
*B62D 55/10* (2006.01)
*B62D 55/108* (2006.01)
*B62D 55/125* (2006.01)

(52) U.S. Cl.
CPC ........... *B62D 55/125* (2013.01); *B62D 55/10* (2013.01); *B62D 55/1083* (2013.01)

(58) Field of Classification Search
CPC .... B62D 55/10; B62D 55/1083; B62D 55/12; B62D 55/125; B62D 55/13; B62D 55/135; B62D 55/30; B62D 55/305
(Continued)

(56) References Cited

U.S. PATENT DOCUMENTS 1,439,236 A * 12/1922 Harris ................... B62D 55/10
180/6.7
1,500,160 A     7/1924 Stoppenbach
(Continued)

FOREIGN PATENT DOCUMENTS

CN     101327816 A     12/2008
CN     102582705 A     7/2012
(Continued)

OTHER PUBLICATIONS

Extended European Search Report dated Jan. 24, 2025, directed to EP Application No. 22776236.6; 9 pages.
(Continued)

*Primary Examiner* — Joshua E Rodden
(74) *Attorney, Agent, or Firm* — Morrison & Foerster LLP

(57) ABSTRACT

The invention relates to a track assembly for a tracked vehicle. Said track assembly includes a track support beam configured to support road wheels, a drive wheel member, and a drive arrangement for drive wheel member operation and an endless track disposed around said road wheels and drive wheel member. Said drive arrangement includes a drive unit for driving said drive wheel member, wherein said drive arrangement includes a drive axle being configured to be coaxially arranged relative to a centre axis of said drive
(Continued)

wheel member for rotating said drive wheel member. Said drive unit is configured to be journaled in bearings to a portion of the drive axle. Said drive unit includes a torque arm configured to be connected to said track support beam so as to essentially prevent rotation of said drive unit about said centre axis.

13 Claims, 10 Drawing Sheets

(58) Field of Classification Search
     USPC ........................................ 108/6.48, 9.1, 9.62
     See application file for complete search history.

(56) References Cited

U.S. PATENT DOCUMENTS

| | | | | |
|---|---|---|---|---|
| 3,583,509 | A | * | 6/1971 | Stachnik ................ A01D 69/00 |
| | | | | 180/9.62 |
| 4,201,279 | A | | 5/1980 | Fukui |
| 9,409,599 | B2 | * | 8/2016 | Thorén ..................... B60S 1/66 |
| 12,084,132 | B2 | * | 9/2024 | Cowper ................... E02F 9/02 |
| 2003/0116366 | A1 | * | 6/2003 | Simmons ............ B62D 55/125 |
| | | | | 180/9.62 |
| 2005/0056469 | A1 | * | 3/2005 | Tucker ................. B62D 55/244 |
| | | | | 180/9.1 |
| 2005/0167967 | A1 | | 8/2005 | Urase |
| 2007/0029878 | A1 | | 2/2007 | Gaudreault |
| 2008/0012422 | A1 | | 1/2008 | Streitz |
| 2009/0078528 | A1 | | 3/2009 | Uzawa |
| 2014/0338991 | A1 | | 11/2014 | Hansen |
| 2018/0022407 | A1 | * | 1/2018 | Lussier .................. B62D 55/10 |
| | | | | 180/9.1 |
| 2018/0363755 | A1 | | 12/2018 | Wakui |
| 2020/0070644 | A1 | | 3/2020 | Tigue |

FOREIGN PATENT DOCUMENTS

| | | |
|---|---|---|
| CN | 110546025 A | 12/2019 |
| CN | 210235129 U | 4/2020 |
| GB | 264378 A | 2/1927 |
| WO | 2018/222105 A1 | 12/2018 |

OTHER PUBLICATIONS

International Search Report and Written Opinion mailed May 12, 2022, directed to International Application No. PCT/SE2022/050287; 11 pages.

Office Action dated Nov. 29, 2021, directed to SE Application No. 2150359-4; 8 pages.

\* cited by examiner

A-A

TRACK ASSEMBLY FOR A TRACKED VEHICLE

CROSS-REFERENCE TO RELATED APPLICATIONS

This application is a U.S. national stage application under 35 U.S.C. § 371 of International Application No. PCT/SE2022/050287, filed Mar. 24, 2022, which claims the priority of SE Application No. 2150359-4, filed Mar. 25, 2021, the entire contents of each priority application is incorporated herein by reference.

FIELD OF THE DISCLOSURE

The present invention relates to a track assembly for a tracked vehicle. The present invention relates to a tracked vehicle comprising at least one such track assembly.

BACKGROUND OF THE DISCLOSURE

Tracked vehicles may comprise a pair of track assemblies, where each track assembly of the pair of track assemblies comprises a track support beam, a drive wheel member, a plurality of road wheels and an endless track running over the drive wheel member and said plurality of road wheels. Said drive wheel member and said plurality of road wheels are rotatably secured to said track support beam. A drive unit of a drive arrangement of said tracked vehicle may be configured to drive a drive axle which in turn is configured to rotate said drive wheel member which is arranged to drive said endless track so as to propel the tracked vehicle.

WO2018222105A1 discloses a tracked vehicle having a track assembly pair, and a vehicle body suspendedly supported by said track assembly pair. Each track assembly comprises a track support beam supporting a plurality of road wheels, a drive wheel and a drive arrangement with a motor for operating the drive wheel, and an endless track disposed around said wheels. Said motor is arranged in connection to the drive wheel so that the motor at least partly is accommodated within the periphery of the drive wheel in the direction transversal to a main direction of extension of the track assembly. The stator of the motor is fixedly arranged to said track support beam via a fastening arrangement in the shape of a fork configuration arranged to support the drive wheel and motor, where said drive wheel is rotatably coupled to the rotor of said motor.

There is however a need to present improvements for track assemblies for tracked vehicles.

OBJECTS OF THE INVENTION

An object of the present invention is to provide a track assembly for a tracked vehicle, where said track assembly comprises a drive arrangement with drive unit, which facilitates a radially compact drive arrangement, with efficient function of said drive unit.

Another object of the present invention is to provide a tracked vehicle with at least one such track assembly.

SUMMARY OF THE DISCLOSURE

These and other objects, apparent from the following description, are achieved by a track assembly for a tracked vehicle, and a tracked vehicle as set out in the appended independent claims. Preferred embodiments of the track assembly are defined in appended dependent claims.

Specifically an object of the invention is achieved by a track assembly for a tracked vehicle. Said track assembly is configured to be connected to a vehicle body of said vehicle. Said track assembly comprises a track support beam configured to support a plurality of road wheels, a drive wheel member, and a drive arrangement for operating said drive wheel member, said drive wheel member being configured to be rotated about a centre axis. An endless track is disposed around said road wheels and drive wheel member. Said drive arrangement comprises a drive unit for driving said drive wheel member. Said drive arrangement comprises a drive axle configured to be coaxially arranged relative to said centre axis of said drive wheel member for rotating said drive wheel member. Said drive unit is configured to be journaled in bearings to a portion of the drive axle protruding from said drive wheel member. Said drive unit comprises a torque arm configured to be connected to said track support beam so as to essentially prevent rotation of said drive unit about said centre axis.

Hereby a radially compact drive arrangement may be provided, which facilitates efficient function of said drive unit, i.e. motor device and transmission device.

According to an embodiment of said track assembly, said drive axle is configured to be journaled in bearings in said track support beam so as to allow rotation of said drive wheel member relative to said track support beam, wherein said drive axle is configured to run through said track support beam, protruding from an inner side of said track support beam configured to face towards the vehicle body when the track assembly is connected to said vehicle body, wherein said drive unit is configured to be journaled in bearings in connection to a portion of the drive axle protruding from the inner side of said track support beam in connection to said drive wheel member. By thus arranging said drive axle so that it is journaled in bearings in said track support beam, the drive arrangement may be efficiently supported, e.g. by means of a bearing configuration, in said track support beam. Hereby said drive axle of said drive arrangement essentially coaxially coincides with the centre axis of the drive wheel member, whereby efficient and radially compact drive unit may be provided by means of said track assembly, facilitating high operational reliability and efficiency when utilized in a tracked vehicle. Such a solution may easily and efficiently be applied to existing track assemblies, and be used for existing drive wheel members.

According to an embodiment of said track assembly, said torque arm is configured to provide torque resistance in connection to rotation of said drive axle. Hereby a radially compact drive arrangement may be provided, which facilitates efficient function of said drive arrangement in connection to driving associated with rotation of said drive axle.

According to an embodiment of said track assembly, said drive unit comprises a motor device for providing torque for driving said drive wheel member and a transmission device for transferring torque from said motor device to said drive wheel member, wherein said transmission device is configured to be arranged in connection to the inner side of said track support beam, said inner side being configured to face towards the vehicle body when the track assembly is connected to said vehicle body, and said motor device is configured to be arranged internally relative to said transmission device so that said transmission device is arranged between the motor device and drive wheel member. Hereby a drive unit and hence drive arrangement which provides an orientation for facilitating efficient drive operation with a radially compact drive arrangement is provided.

According to an embodiment of said track assembly, said drive unit comprises a housing configuration, wherein said torque arm is attached to or constitutes a portion of said housing configuration. Hereby efficient enclosing of motor unit, transmission unit and drive axle and efficient journaling of said drive unit may be obtained.

According to an embodiment of said track assembly, said housing configuration is arranged for housing a motor unit of said motor device and a transmission unit of said transmission device. Hereby efficient enclosing of motor unit, transmission unit for efficient operation of said drive arrangement is provided.

According to an embodiment of said track assembly, said torque arm is configured to be connected to the track support beam such that the torque arm acts on the track support beam in connection to the centre of the journaling in bearings of said drive wheel member so as to limit tipping torque of said torque arm. Hereby connection of said drive unit, i.e. torque arm of drive unit, to said track support beam may be efficiently obtained via a suspension arrangement by thus centrally arranging said torque arm, whereby tipping movement is limited.

According to an embodiment of said track assembly, said connection of said torque arm to said track support beam is arranged to be provided by means of bushings arranged in connection to said track support beam such that a restricted tip movement of the torque arm and hence drive unit relative to said track support beam is allowed. Hereby restricted tip movement of the torque arm of said drive unit may be efficiently provided. According to an embodiment of said track assembly, said connection of said torque arm to said track support beam is arranged to be provided by means of conical bushings of a connection point of said torque arm to which a fastener is provided for said connection to said track support beam, wherein said bushings are arranged in connection to said track support beam such that said restricted tip movement of the torque arm and hence drive unit relative to said track support beam is allowed. embodiment of said track assembly, said connection point of said torque arm and said fastener attached to said connection point is further arranged to provide a fixation in the vertical direction, so as to take up forces in the vertical direction.

According to an embodiment of said track assembly, said housing configuration comprises a transmission housing for housing said transmission unit of said transmission device, wherein said torque arm is attached to or constitutes a portion of said transmission housing. Hereby efficient enclosing of transmission unit and efficient journaling of said transmission device may be obtained.

According to an embodiment of said track assembly, said torque arm comprises a rear arm portion configured to be furthest away from said transmission housing, wherein said rear arm portion comprises at least one connection point for connection to said track support beam, said torque arm further comprising an intermediate portion configured to provide transfer towards said transmission housing, and a front connection portion configured to provide connection to said transmission housing, said front connection portion having an arc-shaped configuration for connection to said ring-shaped transmission housing, said front connection portion comprising a set of connection points arranged along said arc for connection to said transmission housing.

According to an embodiment of said track assembly, said torque arm is topology optimized based on said at least one connection point for connection of the rear arm portion of the torque arm to the track support beam and set of connection points (P226) for connection of the front connection portion of the torque arm to the housing such that there is only structural material of the torque arm where the torque arm is expected to be subjected to forces in the structure.

Specifically an object of the invention is achieved by a tracked vehicle comprising at least one track assembly as set out herein.

According to an embodiment, said tracked vehicle comprises a left track assembly, a right track assembly and a vehicle body, wherein said track assemblies are suspendedly arranged to said vehicle body by means of a suspension arrangement.

The tracked vehicle may comprise one or more tracked vehicle units. The tracked vehicle comprises according to an embodiment more than one tracked vehicle unit, said vehicle units being articulately connected to each other.

According to an embodiment, said tracked vehicle is an articulated tracked vehicle comprising a first vehicle unit and a second vehicle unit pivotably connected to the first vehicle unit via an articulation joint, each of said vehicle units comprising a vehicle body and track assembly pair suspendedly connected to respective vehicle body.

BRIEF DESCRIPTION OF THE FIGURES

A better understanding of the present invention will be had upon the reference to the following detailed description when read in conjunction with the accompanying drawings, wherein like reference characters refer to like parts throughout the several views, and in which.

DETAILED DESCRIPTION OF THE DISCLOSURE

Hereinafter the term "track support beam" refers to a structural element arranged to support ground-engaging means such as e.g. an endless track as well as drive wheel member and road wheels.

Hereinafter the term "track assembly" refers to a unit of the tracked vehicle comprising track support beam, drive wheel member and road wheels as well as a circumferential endless track, which unit is arranged to comprise ground-engaging means and configured to propel the vehicle and thus form at least part of a drive configuration of the tracked vehicle.

Hereinafter the term "track assembly pair" refers to opposite track assemblies of a vehicle unit of the vehicle, one track assembly constituting a right track assembly and the opposite track assembly constituting a left track assembly.

Hereinafter the term "articulated vehicle" refers to a vehicle with at least a front and a rear vehicle unit, which vehicle units are pivotable relative to each other about at least one joint.

Hereinafter the term "vehicle body" refers to any structure of a vehicle configured to be supported by track assemblies of a tracked vehicle and may comprise or constitute the vehicle chassis. The term "vehicle body" may refer to a vehicle frame, one or more beams or the like. The term "vehicle body" may refer to chassis of the vehicle and bodywork.

Hereinafter the term "centre axis", when referring to said drive wheel member being configured to be rotated about a centre axis, refers to the axis about which a drive wheel member of a track assembly is configured to rotate, and hence to an axis running in the transversal direction and perpendicular to the longitudinal direction of the endless track of said track assembly.

Figure 1A:
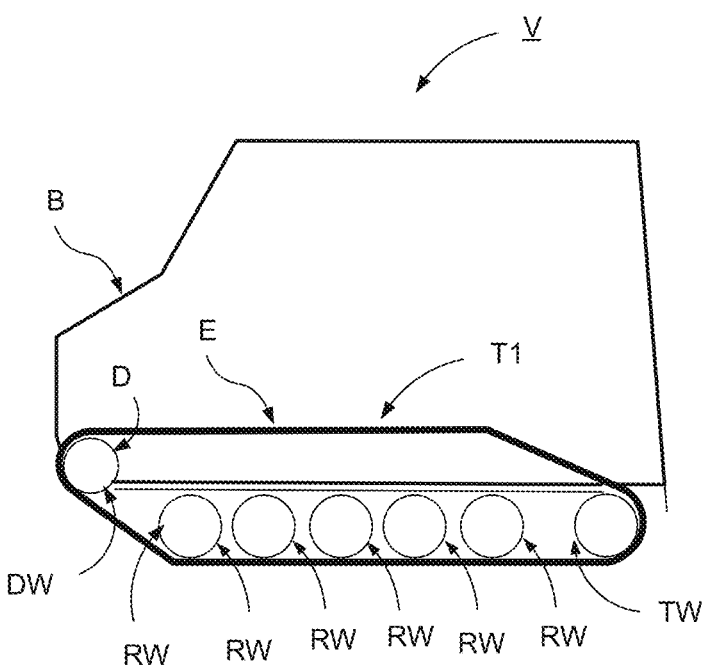
FIG. 1A schematically illustrates a side view of a tracked vehicle comprising track assembly according to an embodiment of the present disclosure.

FIG. 1A schematically illustrates a side view of a tracked vehicle V according to an embodiment of the present disclosure.

The tracked vehicle V comprises a vehicle body B, which according to an aspect of the present disclosure comprises the chassis of the vehicle V and bodywork.

The tracked vehicle V comprises a left track assembly T1 and a right track assembly for driving the vehicle V, the left track assembly T1 being shown in FIG. 1A. Each track assembly comprises a drive wheel member DW, a tension wheel TW, a set of road wheels RW and an endless track E arranged to run over said wheels. The endless track E is thus arranged to be disposed around said wheels. Here the drive wheel member DW is arranged in the front, the tension wheel TW is arranged in the back and the road wheels RW are arranged between the drive wheel member DW and the tension wheel TW. The tracked vehicle according to the present disclosure may however have track assemblies with any suitable arrangement of drive wheel member, tension wheel and road wheels. According to an aspect of the present disclosure the tension wheel may be arranged in the front, the drive wheel member arranged in the back and the road wheels arranged there between.

The endless track E of the respective track assembly is arranged to be driven and hence rotated by means of said drive wheel member DW. The respective track assembly T1 of the tracked vehicle V comprises a drive arrangement D for operating and hence driving said drive wheel member DW. The drive arrangement D is configured to be coaxially arranged relative to the drive wheel member DW.

Figure 1B:
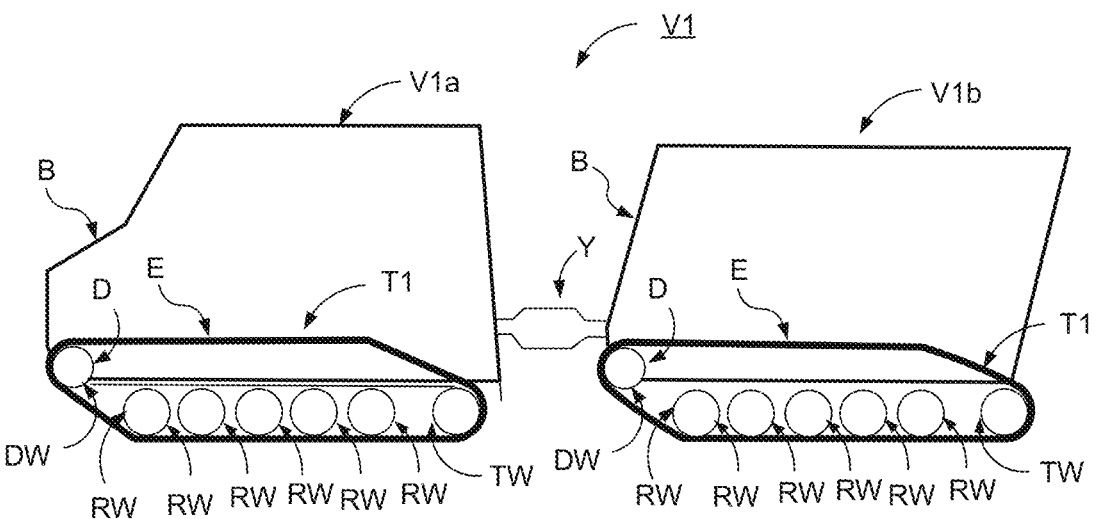
FIG. 1B schematically illustrates a side view of an articulated tracked vehicle comprising track assemblies according to an embodiment of the present disclosure.

FIG. 1B schematically illustrates a side view of a tracked vehicle V1 according to an embodiment of the present disclosure.

Said tracked vehicle V1 is an articulated tracked vehicle V1 comprising a first vehicle unit V1a and a second vehicle unit V1b pivotably connected to the first vehicle unit V1a via an articulation joint Y. Each of said vehicle units V1a, V1b comprises a vehicle body B and track assembly pair T1 suspendedly connected to respective vehicle body B, the left track assembly T1 of the respective vehicle unit V1a, V1b being shown.

Each track assembly comprises a drive wheel member DW, a tension wheel TW, a set of road wheels RW and an endless track E arranged to run over said wheels. The endless track E is thus arranged to be disposed around said wheels. Here the drive wheel member DW is arranged in the front, the tension wheel TW is arranged in the back and the road wheels RW are arranged between the drive wheel member DW and the tension wheel TW.

The endless track E of the respective track assembly of the respective vehicle unit V1a, V1b of said tracked vehicle V1 is arranged to be driven and hence rotated by means of said drive wheel member DW. The respective track assembly T1 of the vehicle units V1a, V1b of said tracked vehicle V1 may comprise a drive arrangement D for operating and hence driving said drive wheel member DW. The drive arrangement D is configured to be coaxially arranged relative to the drive wheel member DW.

Figure 2:
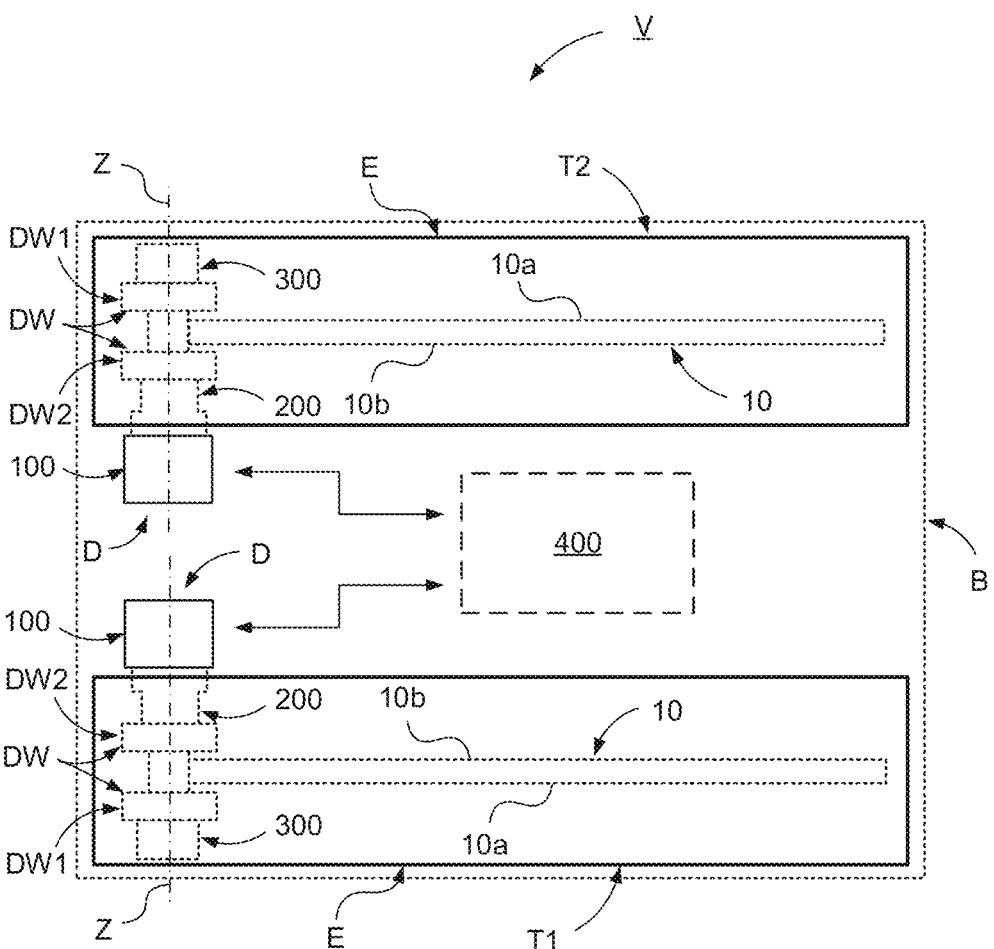
FIG. 2 schematically illustrates a plan view of a tracked vehicle with track assemblies comprising a drive arrangement according to an embodiment of the present disclosure.
Figure 3A:
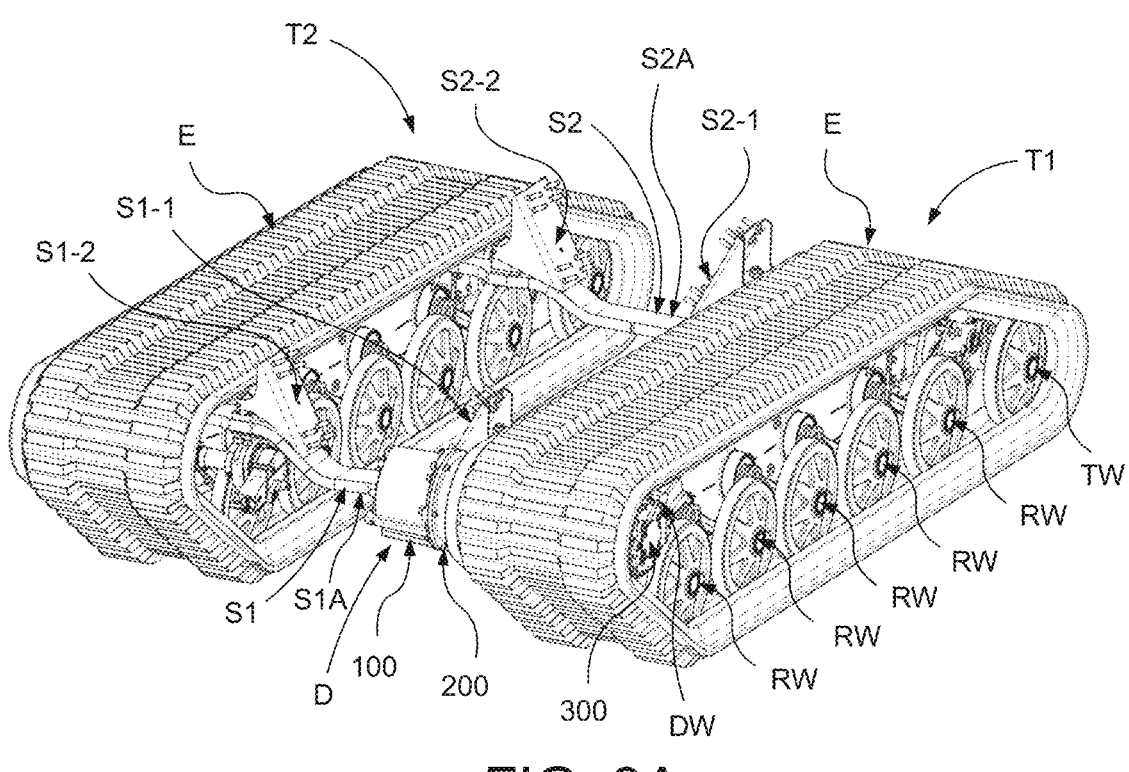
FIG. 3A schematically illustrates a perspective view of a pair of track assemblies of a tracked vehicle according to an embodiment of the present invention.
Figure 3B:
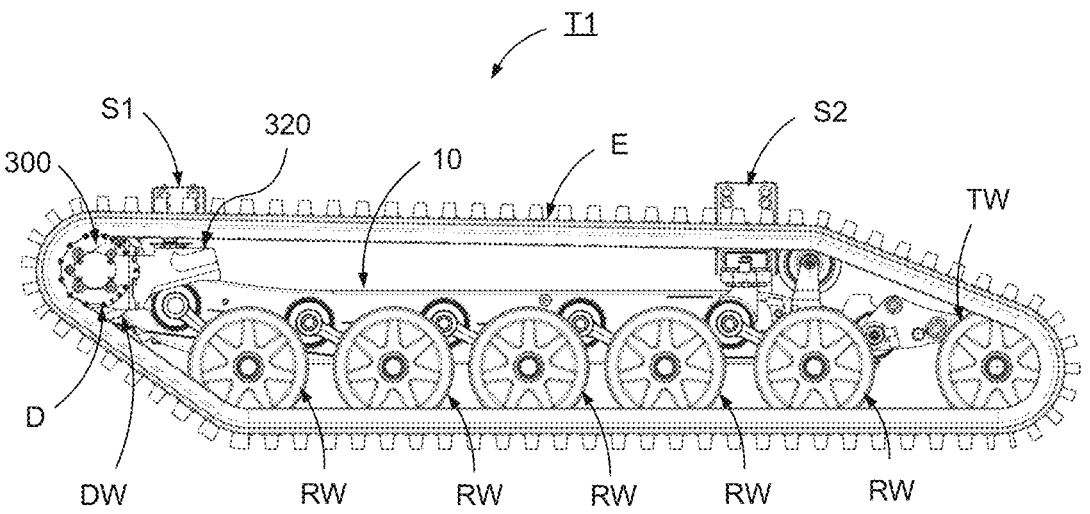
FIG. 3B schematically illustrates a side view of a track assembly in FIG. 3A.

FIG. 2 schematically illustrates a plan view of the tracked vehicle V in FIG. 1A according to an embodiment of the present disclosure. FIG. 3A schematically illustrates a perspective view of a track assembly pair T1, T2 of a tracked vehicle and FIG. 3B schematically illustrates a side view of the left track assembly T1 in FIG. 3A.

The tracked vehicle V comprises a left track assembly T1, a right track assembly T2 and a vehicle body B. The left and right track assemblies T1, T2 provides a track assembly pair T1, T2. Said tracked vehicle V is thus configured to comprises a pair of track assemblies T1, T2 configured to be arranged to suspendedly support said vehicle body B of said vehicle so as to allow relative movement between said vehicle body B and each track assembly T1, T2.

Said track assemblies T1, T2 are suspendedly arranged to said vehicle body by means of a suspension arrangement S1, S2, see e.g. FIG. 3A. The suspension arrangement according to the present disclosure may be any suitable suspension arrangement for suspendedly support said vehicle body.

The left and right track assemblies T1, T2 of said track assembly pair T1, T2 comprises a track support beam 10 configured to support a plurality of road wheels, not shown in FIG. 2, a drive wheel member DW, and a drive arrangement D for operating said drive wheel member DW. The left track assembly T1 comprises a track support beam 10 configured to support a plurality of road wheels, a drive wheel member DW, and a drive arrangement D. The right track assembly T2 comprises a track support beam 10 configured to support a plurality of road wheels, a drive wheel member DW, and a drive arrangement D. The left and right track assemblies T1, T2 of said track assembly pair T1, T2 comprises an endless track E being disposed around said road wheels and drive wheel member DW.

According to an aspect of the present disclosure, e.g. as illustrated in FIG. 3A, the suspension arrangement S1, S2 has a leaf spring configuration.

According to an aspect of the present disclosure, said suspension device S1, S2 comprises a front leaf spring element S1 being transversally arranged relative to the longitudinal extension of the tracked vehicle V in the front portion of said vehicle between the left track assembly T1 and right track assembly T2. Said front leaf spring element S1 is arranged between said left and right track assemblies T1, T2 in connection to the track support beam 10 of the respective track assembly T1, T2. Said front leaf spring element S1 is connected in a first end portion to the track support beam 10 of the left track assembly T1 and connected in an opposite second end portion to the track support beam 10 of the right track assembly. The first end portion of the front leaf spring element S1 is connected to a front part of the track support beam 10 of the left track assembly T1 in connection to said drive wheel member and drive arrangement D of the left track assembly T1. The second end portion of the front leaf spring element S1 is connected to a front part of the track support beam 10 of the right track assembly T2 in connection to said drive wheel member and drive arrangement of the right track assembly T1.

According to an aspect of the present disclosure, said front leaf spring element S1 has a U-shaped configuration S1A having double bending portions/transitions with double bending portions configured to be arranged in connection to the respective side of the vehicle body, and an under portion arranged to run underneath the vehicle body, the vehicle body not being shown in FIG. 3A. The front leaf spring element S1 comprises a first attachment member S1-1 arranged in connection to a first bending portion and a second attachment member S1-2 arranged in connection to an opposite second bending portion of the U-shaped configuration S1A. Said first attachment member S1-1 and second attachment member S1-2 are configured to provide attachment for said vehicle body, not shown in FIG. 3Aa. The U-shaped configuration S1A is further configured to laterally project from each side of the vehicle body and being attached to the track support beam 10 of the left and right track assembly T1, T2.

According to an aspect of the present disclosure, said suspension device S1, S2 comprises a rear leaf spring element S2 being transversally arranged relative to the longitudinal extension of the tracked vehicle V in the front portion of said vehicle between the left track assembly T1 and right track assembly T2. Said rear leaf spring element S2 is arranged between said left and right track assemblies T1, T2 in connection to the track support beam 10 of the respective track assembly T1, T2. Said rear leaf spring element S2 is connected in a first end portion to the a rear part of track support beam 10 of the left track assembly T1 and connected in an opposite second end portion to a rear part of the track support beam 10 of the right track assembly.

According to an aspect of the present disclosure, said rear leaf spring element S2 has a U-shaped configuration S2A having double bending portions/transitions with double bending portions configured to be arranged in connection to the respective side of the vehicle body, and an under portion arranged to run underneath the vehicle body, the vehicle body not being shown in FIG. 3A. The rear leaf spring element S2 comprises a first attachment member S2-1 arranged in connection to a first bending portion and a second attachment member S2-2 arranged in connection to an opposite second bending portion of the U-shaped configuration S2A. Said first attachment member S2-1 and second attachment member S2-2 are configured to provide attachment for said vehicle body, not shown in FIG. 3A. The U-shaped configuration S2A is further configured to laterally project from each side of the vehicle body and being attached to the track support beam 10 of the left and right track assembly T1, T2.

According to an aspect of the present disclosure, not shown, said suspension arrangement may comprises a leaf spring arrangement having portions transversally arranged relative to the longitudinal extension of the vehicle, where said leaf spring arrangement comprises L-shaped leaf spring members, each leaf spring member having a first portion attached to the vehicle body, a second portion attached to the track support beam and a transition portion there between, so that compressive and tensile stresses are located to said transition portion.

Said drive wheel member DW is configured to be rotated about a centre axis Z. The drive arrangement D of the respective track assembly T1, T2 is configured to be coaxially arranged relative to said centre axis Z of said drive wheel member DW. The drive arrangement D of the respective track assembly T1, T2 has a main direction of extension essentially orthogonal to the longitudinal direction of said endless track and essentially parallel to the transversal direction of said endless track E.

The drive arrangement D of the respective track assembly T1, T2 comprises a motor device 100 for driving said drive wheel member DW, a transmission device 200 for transferring torque from said motor device 100 to said drive wheel member DW and a brake arrangement 300 for braking the drive wheel member DW. Said motor device 100 may comprise an electric motor or a hydraulic motor.

As schematically illustrated in FIG. 2, the drive arrangement D of the respective track assembly T1, T2 may be operably connected to a power supply arrangement 400 for providing power for operating the drive arrangement D the respective track assembly T1, T2. The power supply arrangement 400 may be any suitable power supply arrangement for supplying power to drive arrangement D, i.e. supplying power to motor device 100 of said drive arrangement D.

According to an aspect of the present disclosure, said power supply arrangement 400 may comprise an internal combustion engine. According to an aspect of the present disclosure, the internal combustion engine may be constituted by a diesel engine.

According to an alternative aspect of the present disclosure, said power supply arrangement 400 may comprise an energy supply arrangement such as a battery supply arrangement and/or a fuel cell arrangement, e.g. hydrogen fuel cells.

According to an aspect of the present disclosure, said power supply arrangement 400 may comprise one or more generator units for generating high voltage. One or more control devices, e.g. electronic control units, are provided for controlling, e.g. for each drive arrangement D, said one or more control devices comprising one or more control devices configured to receive high voltage from generator units and transfer said high voltage to drive voltage, i.e. alternating voltage, for said motor device 100 of said drive arrangement D. Said power supply arrangement 400 is according to an aspect of the present disclosure configured to provide a D.C. bus configured to distribute power, i.e. voltage, to e.g. each drive arrangement D.

For a tracked vehicle in the shape of an articulated tracked vehicle having a front vehicle unit and a rear vehicle unit, e.g. as illustrated in FIG. 1B, such a power supply 400 may be arranged in the front vehicle unit or the rear vehicle unit or in both the front vehicle unit and the rear vehicle unit.

Figure 4A:
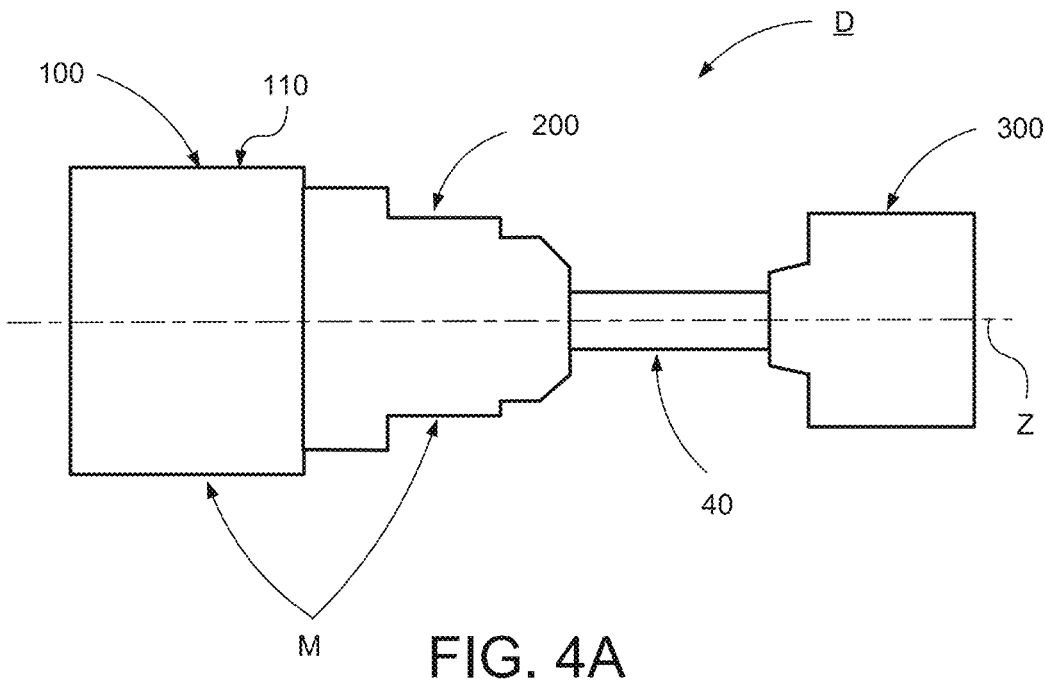
FIG. 4A schematically illustrates a side view of a drive arrangement for a track assembly according to an embodiment of the present disclosure.
Figure 4B:
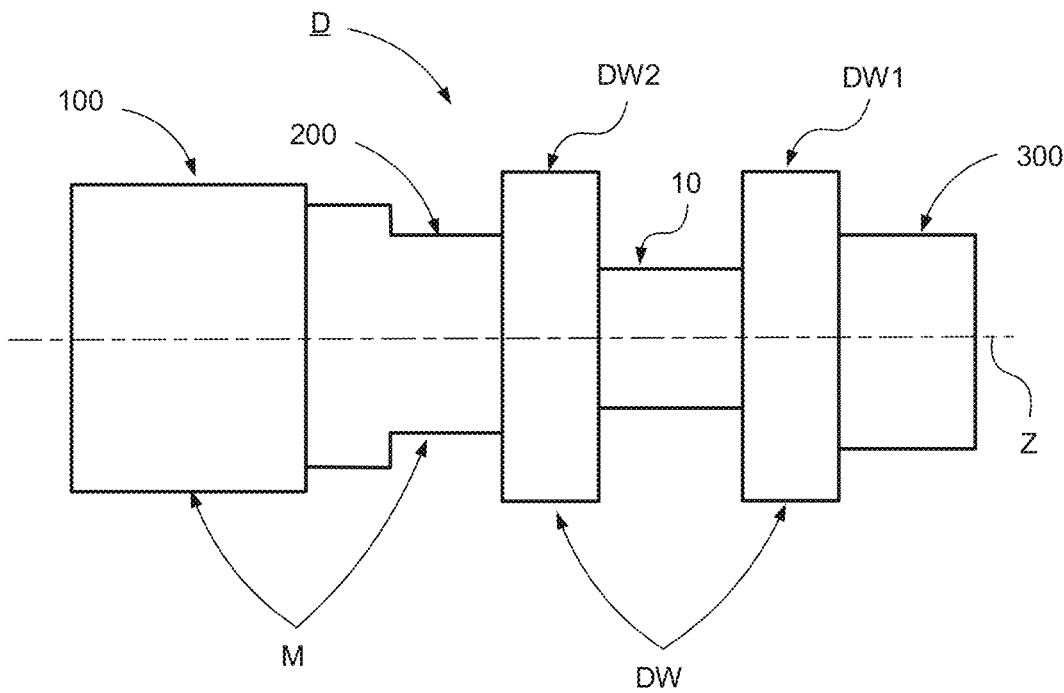
FIG. 4B schematically illustrates a side view of the drive arrangement in FIG. 4A connected to a track support beam of a track assembly and being provided with drive wheel member, according to an embodiment of the present disclosure.

FIG. 4A schematically illustrates a side view of said drive arrangement D and FIG. 4B schematically illustrates a side view of said drive arrangement D supported by said track support beam 10 according to an aspect of the present disclosure.

In FIG. 4B, said drive arrangement D is journaled in bearings to said track support beam 10. In FIG. 4B, said drive arrangement D is operably supporting said drive wheel member DW.

Figure 5:
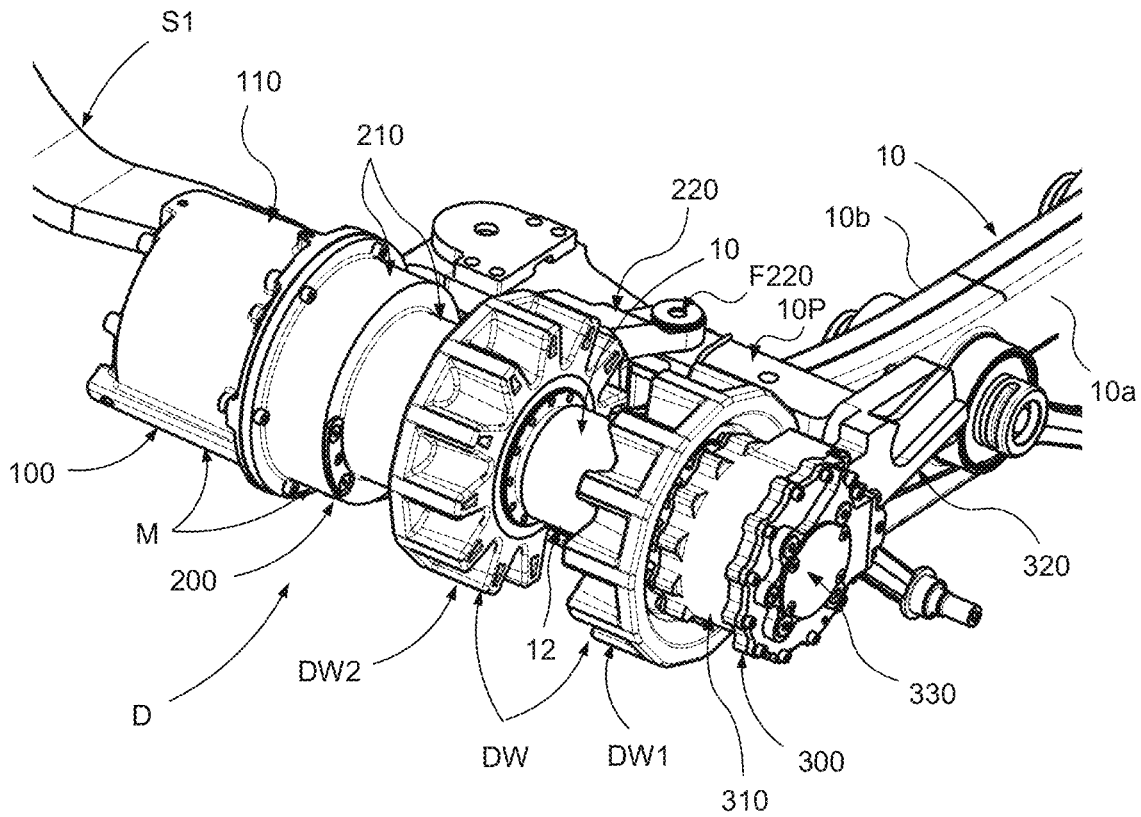
FIG. 5 schematically illustrates a perspective view of a drive arrangement connected to a track support beam of a track assembly and being provided with drive wheel member, according to an embodiment of the present disclosure.

FIG. 5 schematically illustrates a perspective view of said drive arrangement D journaled in bearings to said track support beam 10, operably supporting said drive wheel member DW.

Said drive arrangement D is thus configured to be journaled in bearings in said track support beam 10 for allowing rotation of said drive wheel member DW relative to said track support beam 10 and for supporting said drive arrangement D.

As illustrated in FIG. 2 and FIG. 5, said track support beam 10 has an outer side 10a configured to face away from the vehicle body B and an opposite inner side 10b configured to face towards said vehicle body when the track assembly is connected to said vehicle body B. Herein, when referring to said track support beam 10 having an outer side 10a configured to face away from the vehicle body B and an opposite inner side 10b configured to face towards said vehicle body when the track assembly is connected to said vehicle body B, it refers to a portion of the vehicle body B, e.g. vehicle chassis, arranged between the right and left track assembly and hence right and left drive wheel member. Thus, said track support beam 10 has an outer side 10a facing in a transversal direction of the vehicle V, and transversal direction relative to its longitudinal extension, outwardly away from the opposite track assembly and, and an opposite inner side 10b facing in a transversal direction of the vehicle V, and transversal direction relative to its longitudinal extension, inwardly towards the opposite track assembly.

As schematically illustrated in FIG. 2, the outer side 10a of the track support beam 10 of the left track assembly T1 of the tracked vehicle V is configured to face away from the right track assembly T2 of the tracked vehicle V. As schematically illustrated in FIG. 2, the outer side 10a of the track support beam 10 of the right track assembly T2 of the tracked vehicle V is configured to face away from the left track assembly T1 of the tracked vehicle V.

As schematically illustrated in FIG. 2, the inner side 10b of the track support beam 10 of the left track assembly T1 of the tracked vehicle V is configured to face the right track assembly T2 of the tracked vehicle V. As schematically illustrated in FIG. 2, the inner side 10b of the track support beam 10 of the right track assembly T2 of the tracked vehicle V is configured to face the left track assembly T1 of the tracked vehicle V.

Said drive wheel member DW comprises an outer drive wheel DW1 arranged in connection to the outer side of the track support beam 10 and an inner drive wheel DW2 arranged in connection to the inner side of the track support beam 10.

Figure 6:
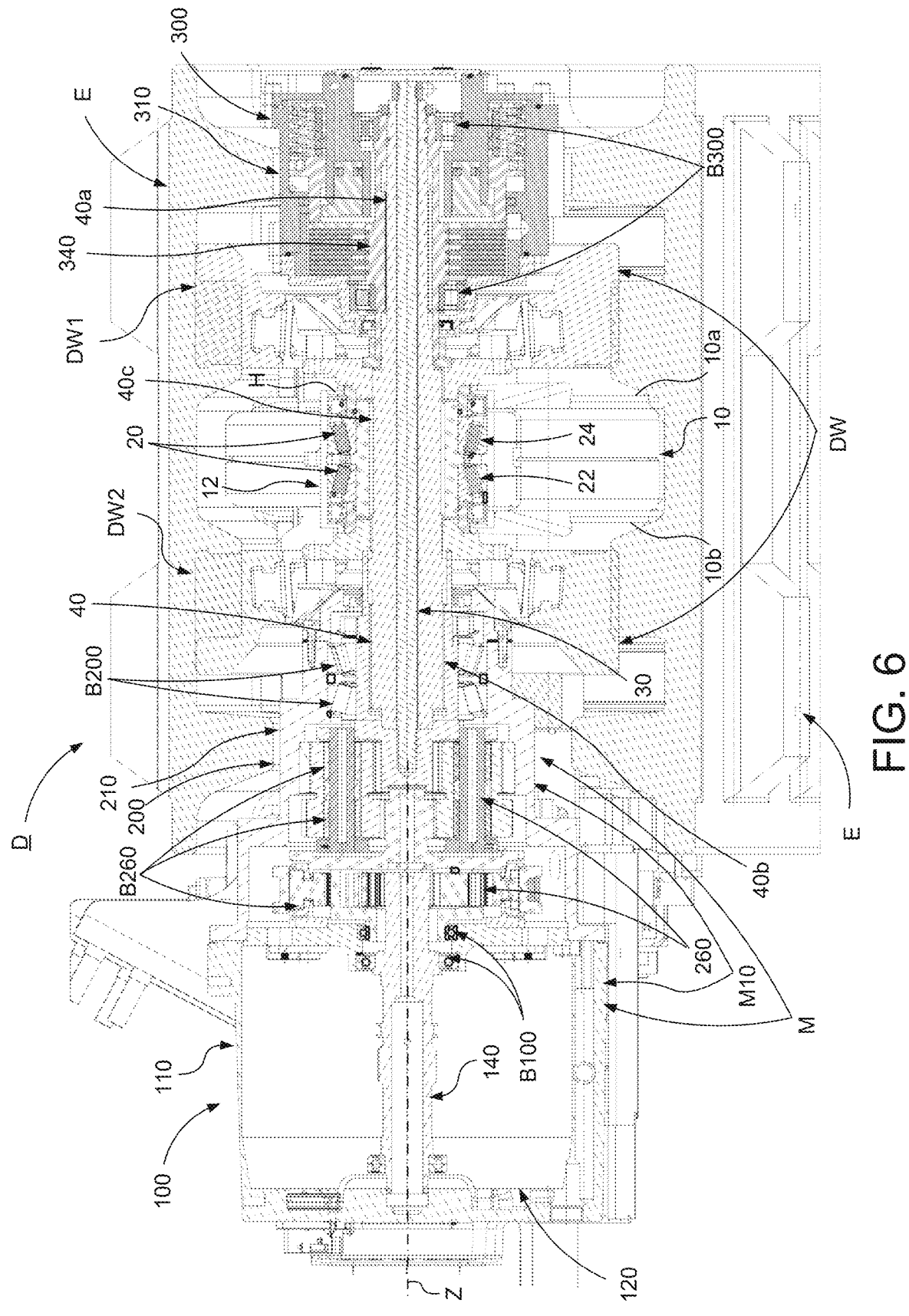
FIG. 6 schematically illustrates a cross sectional view of the drive arrangement in FIG. 5, connected to a track support beam of a track assembly and being provided with drive wheel member, according to an embodiment of the present disclosure.

FIG. 6 schematically illustrates a cross sectional view of said drive arrangement D supported by said track support beam 10 according to an aspect of the present disclosure.

The cross section is in the axial direction, i.e. the direction of the axis Z. Said drive arrangement D is journaled in bearings to said track support beam 10.

Said drive arrangement D comprises a drive axle 40 for driving said drive wheel member DW. Said drive wheel member DW is configured to be operably connected to said drive axle 40. Said drive wheel member DW is according to an aspect of the present disclosure configured to be connected to said drive axle 40 by means of a splines connection.

The track assembly for the respective drive arrangement D comprises a bearing configuration 20 arranged in said track support beam 10 for providing bearing of said drive arrangement D. According to an aspect of the present disclosure, the track support beam 10 has a front portion 12 in which said bearing configuration 20 is configured to be arranged. According to an aspect of the present disclosure, the front portion 12 of the track support beam 10 has a through hole H. The centre of said through hole H will correspond to the centre axis Z when the drive arrangement D and drive wheel member DW is connected to the track support beam 10.

The bearing configuration 20 is configured to be arranged in said through hole H of the front portion 12 of the track support beam 10. According to an aspect of the present disclosure, said bearing configuration 20 is a tapered roller bearing device. According to an aspect of the present disclosure, said bearing configuration 20 comprises a first roller bearing 22 and an opposite second roller bearing 24. According to an aspect of the present disclosure, first roller bearing 22 and second roller bearing 24 are arranged in connection to each other within said through hole H of the front portion 12 of the track support beam 10 so as to optimize facilitating tipping torque of said drive arrangement D. According to an aspect of the present disclosure, said first roller bearing 22 and second roller bearing 24 are configured to be arranged in connection to each other within said through hole H of the front portion 12 of the track support beam 10 such that there is a certain pre-tension in said roller bearings 22, 24 of said bearing configuration 20. According to an aspect of the present disclosure, said tapered roller bearing device comprises said first roller bearing 22 and an opposite second roller bearing 24.

Said drive axle 40 of the drive arrangement D is configured to run through said through hole H of the front portion 12 of the track support beam 10 in connection to said bearing configuration 20. According to an aspect of the present disclosure, the drive axle 40 is configured to be connected to the bearing configuration 20 by means of a splines connection so that said drive axle 40 may be rotated relative to said track support beam 10.

Said drive axle 40 of the drive arrangement D is configured to run through said through hole H of the front portion 12 of the track support beam 10 so that a portion 40a of the drive axel 40 is protruding in the axial direction from said through hole in connection to the outer side 10a of said track support beam 10. According to an aspect of the present disclosure, said outer drive wheel DW1 is configured to be attached to a portion of the drive axle 40 protruding in the axial direction from the outer side of said track support beam 10.

Said drive axle 40 of the drive arrangement D is configured to run through said through hole H of the front portion 12 of the track support beam 10 so that a portion 40b of the drive axel 40 is protruding in the axial direction from said through hole in connection to the inner side 10b of said track support beam 10. According to an aspect of the present disclosure, said inner drive wheel DW2 is configured to be attached to a portion of the drive axle 40 protruding in the axial direction from the inner side of said track support beam 10.

According to an aspect of the present disclosure, said drive axle 40 is running transversely relative to the longitudinal extension of said track support beam 10 through said through hole H. According to an aspect of the present disclosure, said drive axle 40 has a transversal extension with a central portion 40c configured to be arranged in said through hole and connected to said bearing configuration for said journaling in bearings within the front portion 12 of said track support beam 10.

According to an aspect of the present disclosure, said drive axle 40 with said transversal extension with said central portion 40c has an outer extension 40a configured to protrude in the axial direction outwardly from said track support beam into said brake arrangement 300. Said drive axle 40 with said transversal extension with said central portion 40c has an inner extension 40b configured to protrude in the axial direction inwardly from said track support beam into said transmission device 200.

Said bearing configuration 20 is thus, according to an aspect of the present disclosure, arranged in a through hole H of said track support beam 10, centrally between said outer drive wheel DW1 and inner drive wheel DW2.

Said outer drive wheel DW1 and inner drive wheel DW2 are coaxially arranged relative to each other at a distance along the axis Z from each other, wherein said front portion 12 of said track support beam is arranged between said outer drive wheel DW1 and inner drive wheel DW2 such that said through hole H is arranged between said outer drive wheel DW1 and inner drive wheel DW2 coaxially with said axis Z.

According to an aspect of the present disclosure, said drive arrangement D is supported between said outer drive wheel DW1 and inner drive wheel DW2 in said through hole H of said outer portion 12 of said track support beam 10. Said drive axle 40 of said drive arrangement D is supported between said outer drive wheel DW1 and inner drive wheel DW2 in said through hole H of said outer portion 12 of said track support beam 10.

According to an aspect of the present disclosure, said drive arrangement D is supported between said outer drive wheel DW1 and inner drive wheel DW2 in said through hole H of said outer portion 12 of said track support beam 10 by means of supporting said drive axle 40 of said drive arrangement D with said bearing configuration 20. Said bearing configuration 20 is thus arranged in said through hole H of said track support beam 10, centrally between said outer drive wheel DW1 and inner drive wheel DW2.

As mentioned above, the drive arrangement D comprises a motor device 100 for driving said drive wheel member DW, a transmission device 200 for transferring torque from said motor device 100 to said drive wheel member DW and a brake arrangement 300 for braking the drive wheel member DW.

According to an aspect of the present disclosure, said brake arrangement 300 is configured to be arranged in connection to the outer side 10a of said track support beam 10.

According to an aspect of the present disclosure, said transmission device 200 is configured to be arranged in connection to the inner side 10b of said track support beam 10 and said motor device 100 is configured to be arranged internally relative to said transmission device 200 so that said transmission device 200 is arranged between the motor device 100 and brake arrangement 300.

Said motor device 100 may comprise an electric motor or a hydraulic motor. Said motor device 100 comprises a motor housing 110 for housing parts associated with said motor device 100. Said motor device 100 comprises a motor 120 for said driving. Said motor 120 is configured to be housed in said housing 110.

According to an aspect of the present disclosure, said motor comprises a stator configured to be fixedly connected to said motor housing 110 of said motor 100, and a rotor for providing a rotational movement of a motor axle 140 relative to the stator.

According to an aspect of the present disclosure, a power supply, e.g. a power supply 400 schematically illustrated in FIG. 2, may be configured to provide power for said motor device 100, i.e. for operating said rotor 120a of said motor 120 and hence said motor axle 140.

The motor device comprises a bearing configuration B100 arranged in said motor housing 110 of said motor device 100 for providing bearing of said motor axle 140. According to an aspect of the present disclosure, said bearing configuration B100 is a deep groove ball bearing device. According to an aspect of the present disclosure, the motor axle 140 is configured to be connected to the bearing configuration B100 by means of a splines connection so that said motor axle 140 may be rotated relative to said motor housing 110.

According to an aspect of the present disclosure, said motor axle 140 is configured to be operably connected to said transmission device 200 for transferring torque from said motor axle 140 to said drive axle 40.

According to an aspect of the present disclosure, said transmission device 200 comprises a transmission housing 210 for housing parts associated with said transmission device 200.

According to an aspect of the present disclosure, said transmission device 200 comprises a gear arrangement 260. Said gear arrangement 260 may be any suitable gear arrangement for transferring torque from the motor device 100 to said drive wheel member DW for driving a track assembly and hence driving the tracked vehicle having said track assembly.

According to an aspect of the present disclosure, said gear arrangement 260 may comprise a first planetary gear configuration 262. Such a first planetary gear configuration 262 may comprise a high/low planetary gear member configured to provide a high gear position in connection to transferring torque from the motor device 100. According to an aspect of the present disclosure, said gear arrangement 260 may comprise a second planetary gear configuration 264. Such a second planetary gear configuration 264 may comprise a set of planetary gears for providing gear change of said drive wheel member in connection to transferring torque from the first planetary gear configuration 262 to the drive wheel member DW. The first planetary gear configuration 262 is configured to provide a high gear position in connection to transferring torque to said second planetary gear configuration 264, providing no change in speed from the motor 100, and a low gear position configured to reduce the speed of the motor in connection to transferring torque to said second planetary gear configuration 264.

Figure 7:
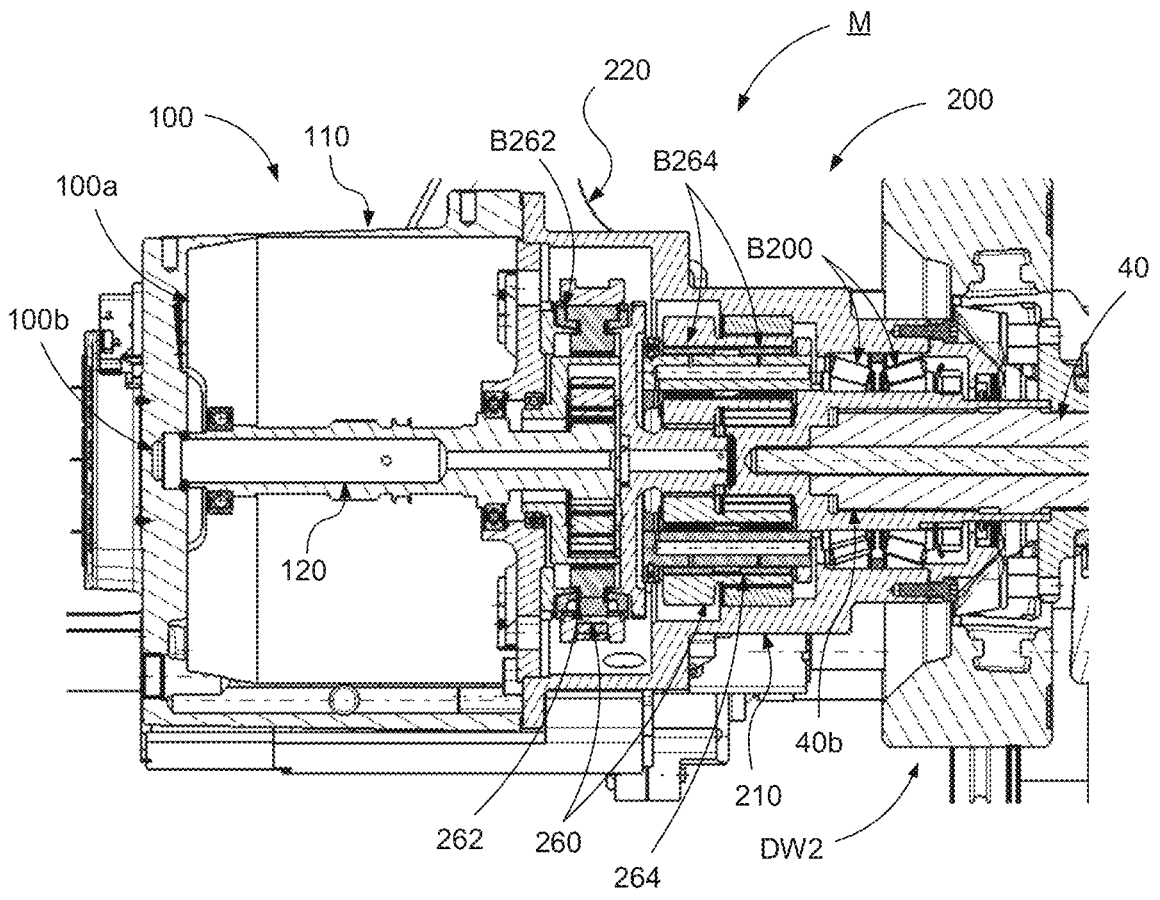
FIG. 7 schematically illustrates a cross sectional view of a drive unit of the drive arrangement in FIG. 6, according to an embodiment of the present disclosure.

The transmission device 200 comprises a bearing configuration B260 arranged for providing bearing of said gear arrangement 260, see FIG. 6. The first planetary gear configuration 262 comprises a first bearing configuration B262. According to an aspect of the present disclosure, said first bearing configuration B262 is a needle roller bearing device. The second planetary gear configuration 262 comprises a second bearing configuration B264. According to an aspect of the present disclosure, said second bearing configuration B264 is a needle roller bearing device. See FIG. 7.

Said transmission device 200 is configured to transfer said torque from said motor device 100 to said drive wheel member DW via said drive axle 40 by means of said gear arrangement 260.

According to an aspect of the present disclosure, said drive axle 40 is configured to run from said transmission device through the inner drive wheel DW2, through the through hole H of said track support beam 10 in connection to said bearing configuration 20, through said outer drive wheel DW1 and further through a major portion of said brake arrangement 300.

According to an aspect of the present disclosure, said motor device 100 and transmission device 200 are comprised in a drive unit M. Said drive arrangement D thus comprises a drive unit M comprising said motor device 100 and transmission device 200. Said motor device 100 and transmission device 200 of the drive arrangement D thus provides a drive unit M. The drive unit M comprises a housing configuration M10. Said housing configuration M10 comprises said motor housing 110 and said transmission housing 210.

According to an aspect of the present disclosure, said drive unit M is configured to be pivotably journaled in bearings in connection to a portion of the drive axle 40 configured to protrude in the axial direction from the inner side 10b of said track support beam 10 so as to allow rotation of the drive axle 40 relative to said housing configuration M10 of said drive unit M. The bearing configuration B200 is configured to be arranged around said portion of said drive axle 40 configured to protrude in the axial direction from the inner side 10b of said track support beam 10.

According to an aspect of the present disclosure, the drive arrangement D comprises a bearing configuration B200 arranged in said housing configuration of said drive unit M, here in connection to the transmission housing 210, for providing bearing of said drive unit M. According to an aspect of the present disclosure, said bearing configuration B200 is a tapered roller bearing device.

According to an aspect of the present disclosure, the drive axle 40 is configured to be connected to the bearing configuration B200 by means of a splines connection so that said drive axle 40 may be rotated relative to said housing configuration, i.e. said transmission housing 210.

According to an aspect of the present disclosure, the drive arrangement D comprises a centre support bar 30 coaxially arranged within said drive arrangement D. Said centre support bar 30 is configured to run in the axial direction, i.e. in the direction of said axis Z. Said centre support bar 30 is configured to run transversely relative to the longitudinal extension of said track support beam 10.

Said centre support bar 30 is configured to supportingly connect said transmission device 200 and brake arrangement 300. Said centre support bar 30 is configured to supportingly connect said drive unit M and brake arrangement 300.

Said centre support bar 30 is configured to coaxially coincide with the centre axis Z of said drive wheel member DW.

Said centre support bar 30 is configured to run through said drive axle 40 so as to provide said connection of said transmission device 200 and brake arrangement 300. Said centre support bar 30 is configured to run through said drive axle 40 so as to provide said connection of said drive unit M and brake arrangement 300.

Said drive axle 40 thus has a tube configuration. Said drive axle 40 thus has the shape of a tube, providing a through hole for said centre support bar 30. Said drive axle 40 thus has a tube configuration, configured to receive said centre support bar 30. Said drive axle 40 has a hollow configuration for allowing introduction of said centre support bar 30 into said drive axle 40.

Said drive unit M comprises a torque arm 220, see e.g. FIG. 5, FIG. 8, FIG. 9, FIG. 10A and FIG. 10B. Said transmission device 200 of said drive unit M comprises a torque arm 220, see e.g. FIG. 5, FIG. 8, FIG. 9, FIG. 10A and FIG. 10B. Said transmission device 200 of said drive arrangement D comprises a torque arm 220, see e.g. FIG. 5, FIG. 8, FIG. 9, FIG. 10A and FIG. 10B.

Figure 8:
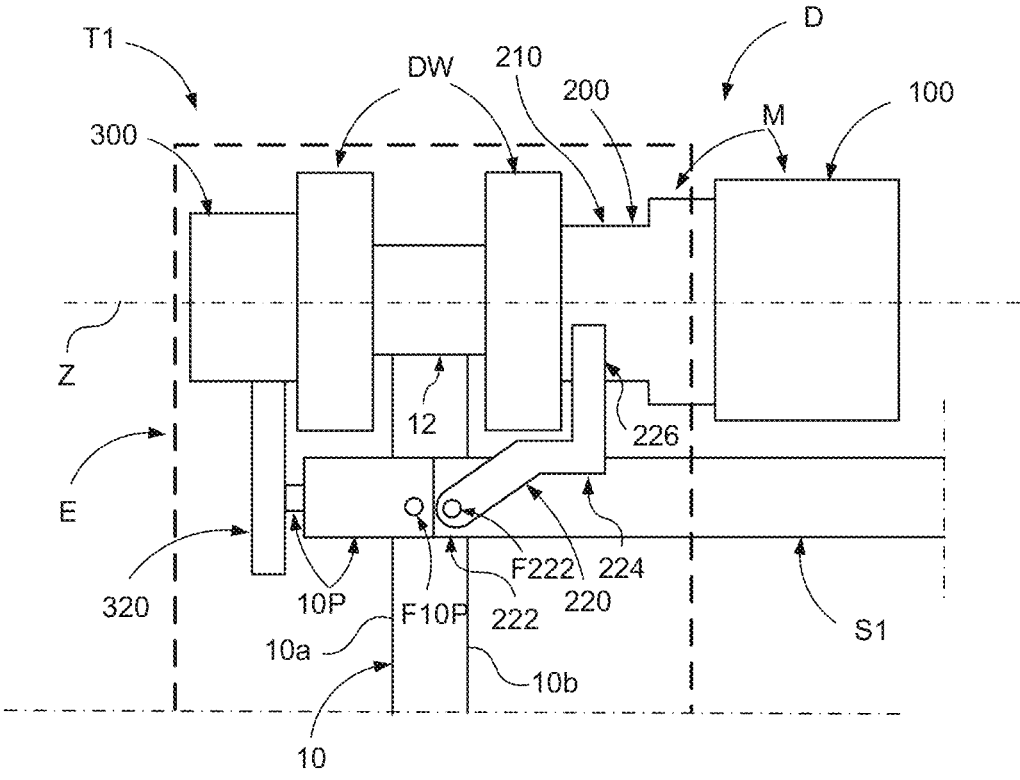
FIG. 8 schematically illustrates a plan view of a portion of a track assembly comprising a drive arrangement with a drive unit having a torque arm according to an embodiment of the present disclosure.
Figure 9:
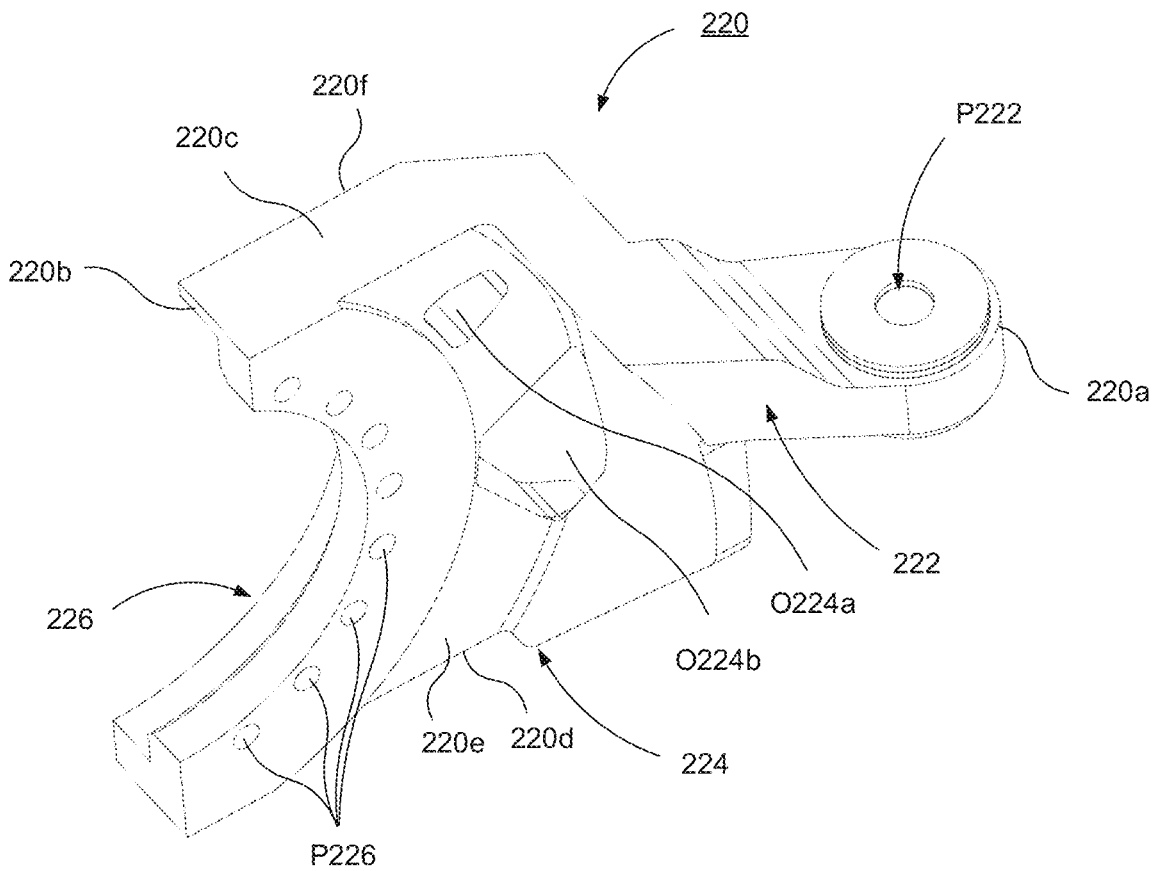
FIG. 9 schematically illustrates a perspective view of a torque arm of the drive unit, according to an embodiment of the present disclosure.
Figure 10A:
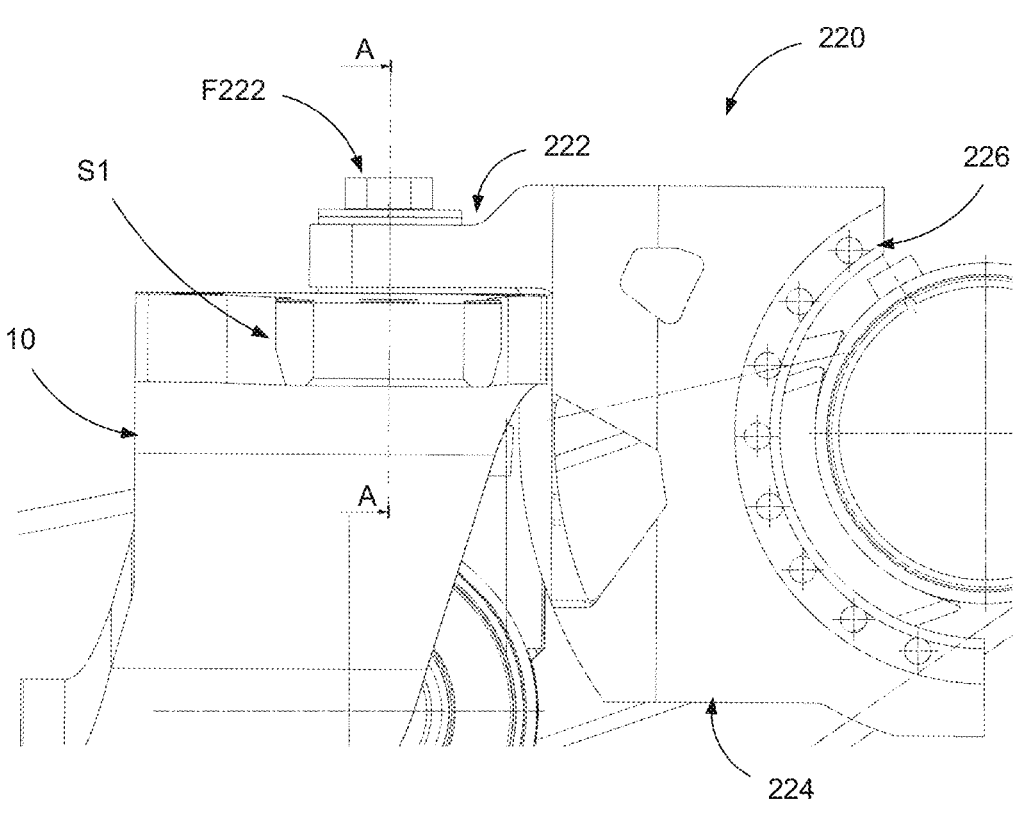
FIG. 10A schematically illustrates a side view of a torque arm of the drive unit attached to a track support beam, according to an embodiment of the present disclosure; and, FIG. 10B schematically illustrates a cross-sectional view of the track support beam connected torque arm in FIG. 10A, according to an embodiment of the present disclosure.
Figure 10B:
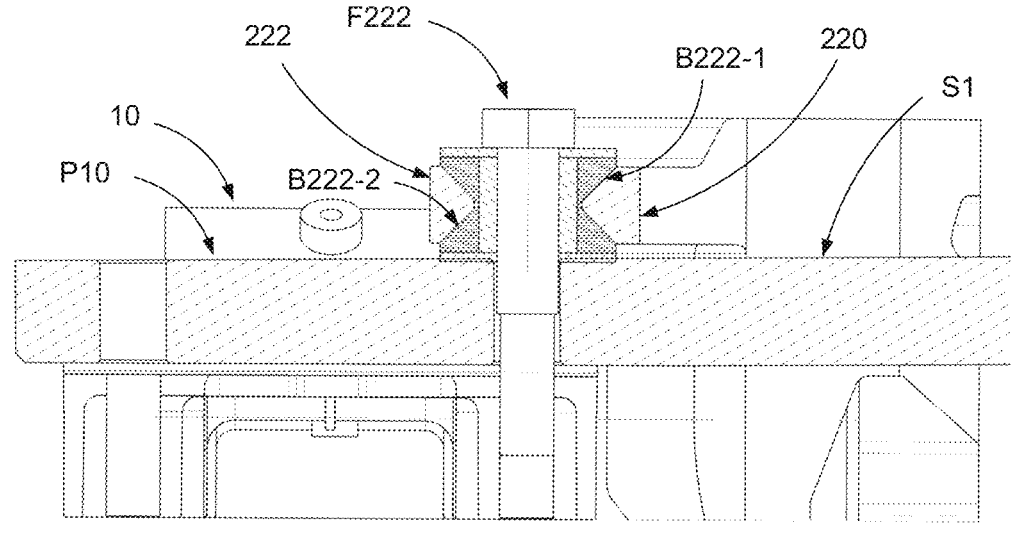

FIG. 8 schematically illustrates a plan view of a portion of a track assembly T1 comprising a drive arrangement D with a drive unit M having a torque arm 220 according to an embodiment of the present disclosure; FIG. 9 schematically illustrates a perspective view of a torque arm 220 of the drive unit, according to an embodiment of the present disclosure; FIG. 10A schematically illustrates a side view of a torque arm 220 of the drive unit attached to the track support beam 10, according to an embodiment of the present disclosure; and, FIG. 10B schematically illustrates a cross-sectional view of the track support beam connected torque 220 arm in FIG. 10A.

Said torque arm 220 is configured to provide torque resistance in connection to rotation of said drive axle 40.

Said torque arm 220 is configured to be connected to said track support beam 10 so as to essentially prevent rotation of said transmission device 200 about said centre axis Z. Said torque arm 220 is configured to be attached to or constitute a portion of said transmission housing 210. Said torque arm 220 is configured to be connected to said track support beam 10 so as to essentially prevent rotation of said transmission housing 210 about said centre axis Z.

Said torque arm 220 is configured to be connected to the track support beam 10 such that the torque arm 220 acts on the track support beam 10 in connection to the centre of the journaling in bearings of said drive wheel member DW so as to limit tipping torque of said torque arm 220.

According to an aspect of the present disclosure, said torque arm 220 is configured to be attached to a portion of said transmission housing 210 facing in the rear direction of the tracked vehicle, when said drive unit M and hence transmission device 200 is assembled to said track assembly. According to an aspect of the present disclosure, said torque arm 220 is configured to be attached to said transmission housing 210 such that it projects in the rear direction along said track support beam 10, see e.g. FIG. 5 and FIG. 9.

According to an aspect of the present disclosure, said torque arm 220 has a rear side 220a configured to face away from said transmission housing 210 and be attached in connection to said track support beam 10, see e.g. FIG. 5, FIG. 8 and FIG. 9. According to an aspect of the present disclosure, said torque arm 220 has a front side 220b, see e.g. FIG. 5, FIG. 8 and FIG. 9, configured to face towards said transmission housing 210 and be attached to said transmission housing 210.

According to an aspect of the present disclosure, said torque arm 220 has a upper side 220c configured to face upwardly when said brake arrangement is assembled to a track assembly of a tracked vehicle being essentially horizontally positioned on the ground and an opposite under side 220d, see e.g. FIG. 9.

According to an aspect of the present disclosure, said torque arm 220 has an outer side 220e configured to face outwardly towards the inner side 10b of said track support beam 10 when said brake arrangement is assembled to a track assembly of a tracked vehicle and an opposite inner side 220ƒ configured to face away from said track support beam 10, see e.g. FIG. 8 and FIG. 9.

According to an aspect of the present disclosure, said torque arm 220 has a rear arm portion 222 configured to be furthers away from said transmission housing 210, see e.g. FIG. 8 and FIG. 9. Said rear arm portion is configured to be attached in connection to said track support beam 10. Said rear arm portion is configured to be attached in connection to said track support beam 10. Said rear arm portion 222 comprises at least one connection point P222 for connection to said track support beam 10. According to an aspect, said rear arm portion 222 is connected to said at said connection point P222 by means of the same fastener F222 as the suspension arrangement S1. The suspension arrangement S1 may According to an aspect of the present disclosure, said torque arm 220 has an intermediate portion 224 configured to provide transfer towards said transmission housing 210.

According to an aspect of the present disclosure, said torque arm 220 has a front connection portion 226 configured to provide connection to said transmission housing 210, see FIG. 5, FIG. 8, FIG. 9, FIG. 10A and FIG. 10B. Said front connection portion 226 has an arc-shaped configuration for connection to said ring-shaped transmission housing 210. Said front connection portion 226 comprises a set of connection points P226 arranged along said arc for connection to said transmission housing.

According to an aspect of the present disclosure, said connection of said torque arm 220 to said track support beam 10 is arranged to be provided by means of bushings arranged in connection to said track support 10 beam such that a restricted tip movement of the torque arm 220 and hence drive unit M relative to said track support beam 10 is allowed. According to an aspect of the present disclosure, said connection of said torque arm 220 to said track support beam 10 is arranged to be provided by means of conical bushings B222-1, B222-2 of a connection point P222 of said torque arm 222 to which a fastener F222 is provided for said connection to said track support beam 10, wherein said bushings B222-1, B222-2 are arranged in connection to said track support beam 10 such that said restricted tip movement of the torque arm 220 and hence drive unit relative to said track support beam 10 is allowed. According to an aspect of the present disclosure, said connection point F222 of said rear arm portion 222 comprises two conical bushings B222-1, B222-2 arranged so as to facilitate said restricted tip movement of the torque arm 220 relative to said track support beam 10 when said rear arm portion 222 is attached by means of said fastener F222, see FIG. 10B. According to an aspect of the present disclosure, said connection point F222 and said fastener attached to said connection point F222 is further arranged to provide a fixation in the vertical direction, so as to take up forces in the vertical direction.

Said torque arm 222 is configured to be attached to said track support beam 10 at said connection point P222 by means of said fastener F222 at said rear arm portion 222 so as to impede movement of the torque arm 220 and hence transmission housing 210 relative to said track support beam 10 in the vertical direction of said endless track E, preventing rotation of said transmission housing 210.

According to an aspect of the present disclosure, said torque arm 220 is topology optimized based on one or more connection points for connection of the torque arm 220 to the track support beam 10 and one or more connection points for connection of the torque arm 220 to the housing 210 such that there is only structural material of the torque arm 220 where the torque arm 220 is expected to be subjected to forces in the structure.

According to an aspect of the present disclosure, said torque arm 220 is topology optimized based on said at least one connection point F222 for connection of the rear arm portion 222 of the torque arm 220 to the track support beam 10 and set of connection points P226 for connection of the front connection portion 226 of the torque arm 220 to the housing 210 such that there is only structural material of the torque arm 220 where the torque arm 220 is expected to be subjected to forces in the structure. Hereby said intermediate portion 224 of the torque arm 220 is provided with a first recess O224a arranged in an upper portion of said intermediate portion 224 and a second recess O224b arranged in a central/lower portion of said intermediate portion 224. Said recesses O224a, O224b are openings in the shape of through holes.

Said brake arrangement 300 comprises a torque arm 320, see e.g. FIG. 5 and FIG. 8. Said torque arm 320 is configured to be connected to said track support beam 10 so as to essentially prevent rotation of said brake arrangement 300 about said centre axis Z. Said torque arm 320 is configured to be attached to or constitute a portion of said brake housing 310. Said torque arm 320 is configured to be connected to said track support beam 10 so as to essentially prevent rotation of said brake housing 310 about said centre axis Z.

According to an aspect of the present disclosure, said torque arm 320 is configured to be attached to a rear portion of said brake housing 310. According to an aspect of the present disclosure, said torque arm 320 is configured to be attached to a portion of said brake housing 310 facing in the rear direction of the tracked vehicle, when said brake arrangement is assembled to said track assembly. According to an aspect of the present disclosure, said torque arm 320 is configured to be attached to said brake housing 310 such that it projects in the rear direction along the outer side 10a of said track support beam 10, see e.g. FIG. 5 and FIG. 8.

According to an aspect of the present disclosure, said torque arm 320 has an outer side configured to face away from said track support beam 10 when said brake arrangement is assembled to a track assembly of a tracked vehicle and an opposite inner side configured to face towards said track support beam 10.

Said torque arm 320 is configured to provide torque resistance in connection to a brake action of said brake arrangement 300 on said drive axle 40. Said torque arm 320 is configured to be connected to said track support beam 10 so as to provide torque resistance in connection to a brake action of said brake arrangement 300 on said drive axle 40.

According to an aspect of the present disclosure, said torque arm 320 is configured to be movably connected to said track support beam 10 such that the movement of the torque arm 320 and hence brake arrangement 300 relative to said track support beam 10 is a movement in the longitudinal direction of said endless track E. According to an aspect of the present disclosure, said torque arm 320 is configured to be movably connected to said track support beam 10 such that the movement of the torque arm 320 and hence brake arrangement 300 relative to said track support beam 10 is a movement in the longitudinal direction of said track support beam 10.

According to an aspect of the present disclosure, said torque arm 320 is configured to be connected to said track support beam 10 by means of a pin member 10P between said torque arm 320 and track support beam 10. According to an aspect of the present disclosure, said pin member 10P is configured to be connected to said track support beam 10 by means of a fastener FOP. According to an aspect of the present disclosure, said pin member 10P is configured to essentially provide an extension of said suspension arrangement S1 towards said torque arm 320. According to an aspect of the present disclosure, said pin member 10P is configured to be connected to said track support beam 10 close to the connection point P222 of the torque arm 220.

According to an aspect of the present disclosure, said pin member 10P is configured to be fixedly attached in one end to said track support beam 10 and connected to said torque arm 320 in the opposite end such that movement of the torque arm 320 and hence brake arrangement 300 relative to said track support beam 10 in the longitudinal direction of said endless track E is facilitated and movement in the vertical direction is impeded, i.e. essentially prevented.

The foregoing description of the preferred embodiments of the invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling other skilled in the art to understand the invention for various embodiments and with the various modifications as are suited to the particular use contemplated.

The invention claimed is:

1. A track assembly for a tracked vehicle, said track assembly being configured to be connected to a vehicle body of said vehicle, said track assembly comprising a track support beam supporting a plurality of road wheels, a drive wheel member, and a drive arrangement for operating said drive wheel member, said drive wheel member being rotated about a centre axis, an endless track being disposed around said road wheels and drive wheel member, wherein said drive arrangement comprises a drive unit for driving said drive wheel member, wherein said drive arrangement comprises a drive axle being coaxially arranged relative to said centre axis of said drive wheel member for rotating said drive wheel member, wherein said drive unit is journaled in bearings to a portion of the drive axle protruding from said drive wheel member, wherein said drive unit comprises a torque arm connected to said track support beam so as to essentially prevent rotation of said drive unit about said centre axis.

2. The track assembly of claim 1, wherein said drive axle is journaled in bearings in said track support beam so as to allow rotation of said drive wheel member relative to said track support beam, wherein said drive axle runs through said track support beam, protruding from an inner side of said track support beam configured to face towards the vehicle body when the track assembly is connected to said vehicle body, wherein said drive unit is journaled in bearings in connection to a portion of the drive axle protruding from the inner side of said track support beam in connection to said drive wheel member.

3. The track assembly of claim 1, wherein said torque arm is configured to provide torque resistance in connection to rotation of said drive axle.

4. The track assembly of claim 1, wherein said drive unit comprises a motor device for providing torque for driving said drive wheel member and a transmission device for transferring torque from said motor device to said drive wheel member, wherein said transmission device is arranged in connection to the inner side of said track support beam, said inner side being configured to face towards the vehicle body when the track assembly is connected to said vehicle body, and said motor device is arranged internally relative to said transmission device so that said transmission device is arranged between the motor device and drive wheel member.

5. The track assembly of claim 4, wherein said drive unit comprises a housing configuration, wherein said torque arm is attached to or constitutes a portion of said housing configuration.

6. The track assembly of claim 5, wherein said housing configuration is arranged for housing a motor unit of said motor device and a transmission unit of said transmission device.

7. The track assembly of claim 2, wherein said torque arm is connected to the track support beam such that the torque arm acts on the track support beam in connection to the centre of the journaling in bearings of said drive wheel member so as to limit tipping torque of said torque arm.

8. The track assembly of claim 7, wherein said connection of said torque arm to said track support beam is arranged to be provided by bushings arranged in connection to said track support beam such that a restricted tip movement of the torque arm and hence drive unit relative to said track support beam is allowed.

9. The track assembly of claim 5, wherein said housing configuration comprises a transmission housing for housing said transmission unit of said transmission device, said torque arm is attached to or constitutes a portion of said transmission housing.

10. The track assembly according to claim 9, wherein said torque arm comprises a rear arm portion configured to be furthest away from said transmission housing, wherein said rear arm portion comprises at least one connection point for connection to said track support beam, said torque arm further comprising an intermediate portion configured to provide transfer towards said transmission housing, and a front connection portion configured to provide connection to said transmission housing, said front connection portion having an arc-shaped configuration for connection to said transmission housing, said front connection portion comprising a set of connection points arranged along said arc for connection to said transmission housing.

11. The track assembly of claim 10, wherein said torque arm is topology optimized based on said at least one connection point for connection of the rear arm portion of the torque arm to the track support beam and set of connection points for connection of the front connection portion of the torque arm to the housing such that there is only structural material of the torque arm where the torque arm is expected to be subjected to forces.

12. A tracked vehicle comprising at least one track assembly of claim 1.

13. The tracked vehicle of claim 12, including a vehicle body and wherein the at least one track assembly of said tracked vehicle comprises a left track assembly, and a right track assembly, wherein said track assemblies are suspendedly arranged to said vehicle body by a suspension arrangement.

* * * * *